C. C. TITUS & W. J. BARENSCHEER.
PROCESS OF TREATING ZINC ORES.
APPLICATION FILED AUG. 31, 1914.
1,173,467.   Patented Feb. 29, 1916.
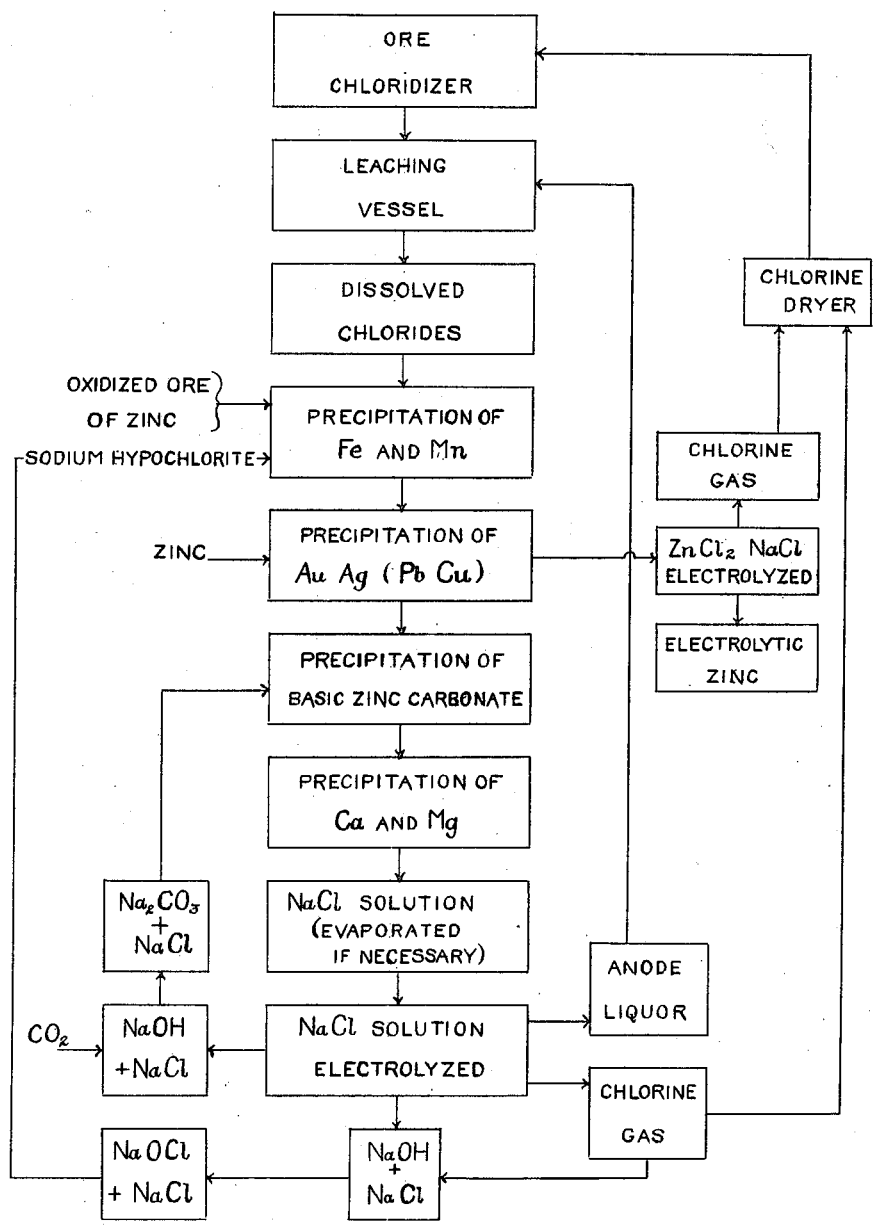

UNITED STATES PATENT OFFICE.

COURT C. TITUS AND WILLIAM J. BARENSCHEER, OF HELENA, MONTANA, ASSIGNORS TO NEW ENGLAND ELECTRO-CHEMICAL METALS COMPANY, OF BOSTON, MASSACHUSETTS, A CORPORATION OF MAINE.

PROCESS OF TREATING ZINC ORES.

1,173,467. Specification of Letters Patent. Patented Feb. 29, 1916.

Application filed August 31, 1914. Serial No. 859,307.

*To all whom it may concern:*

Be it known that we, COURT C. TITUS, and WILLIAM J. BARENSCHEER, citizens of the United States, residing at Helena, in the county of Lewis and Clark and State of Montana, have invented certain new and useful Improvements in Processes of Treating Zinc Ores, of which the following is a specification.

This invention relates to cyclic processes for the treatment of ores of zinc, including concentrates or tailings from such ores, the process being especially adapted for the treatment of complex sulfid ores containing relatively large proportions of zinc and iron, some manganese, and variable amounts of gold, silver, arsenic and antimony. Other metals, as lead, copper, cadmium bismuth, calcium and magnesium may be present in varying proportions. The following is an illustrative analysis of a material of this character:—

| | |
|---|---|
| Zinc | 16 per cent. |
| Iron | 8-10 " " |
| Manganese | 1-1.5 " " |
| Sulfur | 13-14 " " |
| Lead | 2.5-3 " " |
| Copper | .5-.75 " " |
| Gold | .12 " " |
| Silver | 7-9 ounces per ton. |
| Soluble lime and magnesia | 1.5 " " " |
| Insoluble matter | 50-55 per cent. | together with variable small proportions of arsenic, antimony, bismuth and cadmium.

A preferred embodiment of our cyclic process is as follows, the principal steps being illustrated in the accompanying diagrammatic drawings:—

The dry ore is first chloridized, the metalloids, sulfur, arsenic, and antimony, being eliminated as chlorids, and the base metals, including zinc, iron, and manganese, and lead and copper if present, converted into soluble chlorids. As such method, we prefer to employ that described in our prior Patent No. 1,069,498, patented August 5, 1913, although we do not desire to be restricted thereto. According to the said patent, the dry ore is coarsely crushed (to pass a screen having eight meshes to the linear inch), mixed with about 5 per cent. of dry sodium chlorid, and treated with dry chlorin gas, the treating vessel being externally heated to maintain a temperature above the melting-point of zinc chlorid. Under these conditions the sulfur, arsenic, and antimony are volatilized as chlorids and condensed outside of the treating vessel. The heavy metal chlorids, with the associated sodium chlorid serving as a flux, collect in a melted condition in the vessel and may be tapped out, and thus separated from the gangue. These heavy metal chlorids are then brought into solution. As a solvent, we may use water, or a solution containing sodium chlorid, the latter preferably derived from the electrolytic cells and containing also some free chlorin and oxy-chlorin compounds, as below explained.

However the solution may be obtained, it contains all of the soluble chlorids derived from the ore, together with any sodium chlorid added to the ore or introduced with the leaching solution. The object of the process, from this point, is ultimately to replace each of the dissolved metal chlorids by sodium chlorid, the metals being precipitated either as such or in the form of compounds, with the result that the final solution is a commercially pure brine, of such concentration that it may be directly electrolized with economy, or at least may be cheaply evaporated to a suitable concentration for electrolysis.

With this object in view the acid-reacting solution is first treated with a suitable oxy-ore of zinc, in which term we include the native carbonates and silicates of zinc, and also dead-roasted zinc sulfid ores, the carbonate and silicate ores being deemed preferable. By this means, the iron is precipitated as hydroxid, an equivalent of zinc passing into the solution, which is thereby neutralized. In case manganese is present, we also add at this stage an equivalent of sodium hypochlorite, which is produced at a later stage of the process, as explained below. The effect of these additions is to eliminate iron and manganese, while correspondingly concentrating the zinc and sodium chlorids in the solution.

The primary advantage of using native oxy-ores of zinc, as compared with chemically-produced zinc oxid or carbonate, lies in their effect upon the subsequent filtration of the precipitated iron and manganese. These precipitates are, as is well known, colloidal in character and difficult to filter; and this character is especially strongly marked when the precipitation is effected by means of chemically-prepared oxy-compounds of zinc. When native ores are used, however, as in the present process, the precipitate is much more easily removed by filtration. While the reasons underlying this effect are not certainly known, it is apparently connected with the slower rate at which the precipitation occurs in presence of native ores as compared with the chemically-prepared zinc compounds, and also with the physical nature of the lighter gangue material or insoluble matter of the ore, which passes to the filters with the iron and manganese precipitates. Our preferred practice in handling these precipitates is to agitate the chlorid solution with the native ore, crushed to about 60 mesh, until the iron and manganese are completely precipitated; then to decant and filter the suspended precipitate, together with the lighter insoluble material derived from the ore, the heavier ore-residue being washed out and subsequently treated as its composition may indicate.

Other advantages of using the native ores are their relatively low cost, and the fact that by such use a proportion of the zinc content of such ores is directly extracted and passes into the cycle without the expense of chloridizing. We have found it practicable to extract as much as 80 per cent. of the zinc content of calamin ore by employing it as a precipitating agent for iron in the manner above indicated.

From the clear solution thus obtained, any gold and silver are precipitated by means of metallic zinc, with a corresponding slight augmentation of the zinc chlorid content of the solution. Lead, copper, cadmium, and bismuth are likewise precipitated if present, at this stage. In case the original ore contains considerable proportions of lead, it may be preferable preliminarily to remove the bulk of the lead as chlorid, for example by suitably cooling the original solution, or otherwise.

After the precipitation of the precious and associated metals, the solution consists essentially of the chlorids of zinc and sodium, with small proportions of calcium and magnesium chlorid. This solution (or a certain proportion thereof, as hereinafter explained), is now treated with normal sodium carbonate, whereby the zinc is completely precipitated as basic zinc carbonate, care being taken to avoid so far as possible such excess of sodium carbonate as would also precipitate the calcium and magnesium. The basic zinc carbonate is collected on filters, and a further small proportion of sodium carbonate is added to precipitate the calcium and magnesium, the solution being again filtered or decanted.

At this point, we have a more or less concentrated solution consisting essentially of sodium chlorid and water. When the ores have been chloridized dry in the presence of salt, and the soluble chlorids leached out with a brine solution, as in our preferred process, this residual solution usually contains upward of 20 per cent of sodium chlorid, or a reasonable approximation to saturation. The solution is evaporated if necessary and then electrolyzed in any suitable electrolytic cell, preferably of the diaphragm type. The direct products of this electrolysis are chlorin gas; a solution of caustic soda containing sodium chlorid; and an overflowing anode-liquor consisting of nearly saturated brine containing some free chlorin and some oxy-chlorin compounds, such as sodium hypochlorite and chlorate. These products re-enter the cycle as follows:—

The bulk of the chlorin gas is dried (for example by refrigeration), liquefied if desired, and returned to the chloridizer. A quantity of the chlorin gas proportionate to the manganese present in the ore is absorbed in a corresponding quantity of the caustic solution from the cells, and the resulting hypochlorite used for the manganese precipitation as above described.

The bulk of the caustic solution from the electrolytic cells is converted into normal carbonate by treatment with flue gases, previously suitably purified, and is employed for precipitating the zinc as basic carbonate, as described above.

The chlorinated anode-liquor is led to the leaching vats, and employed for the extraction of the metal chlorids. In so utilizing the anode-liquor, it is generally necessary to dilute it somewhat, in order to prevent the precipitation of sodium chlorid in the leaching vessels, through displacement by the more readily soluble metal chlorids of the ore. This mode of utilizing the chlorinated anode-liquor is highly advantageous, not only because the concentration of the pure sodium chlorid solution which we ultimately obtain is thereby directly increased, but because the free chlorin and oxy-chlorin compounds of the anode-liquor serve to oxidize any ferrous chlorid which may be contained in the chloridized ore. This permits the chloridizing operation to be arrested while some ferrous chlorid still remains, thereby economizing chlorin.

A modification of the above cycle may consist in precipitating a part only of the zinc as basic carbonate, the balance being electrolyzed directly, with production of electrolytic zinc and chlorin gas, the latter passing through the drying system and thence to the chloridizer. Or any part or all of the zinc-bearing solution from which the precious metals have been precipitated may be first electrolyzed with insoluble anodes to precipitate a portion of its zinc content as metal, the impoverished solution being then treated to precipitate the remaining zinc in the form of basic carbonate, the cycle continuing as above described.

We claim:—

1. In a cyclical process of treating complex ores containing zinc, the steps which consist in chloridizing the ore, extracting the soluble chlorids, precipitating the metal contents of the solution with ultimate replacement of their chlorids by sodium chlorid, electrolyzing the resulting sodium chlorid solution, and applying the evolved chlorin to the treatment of fresh batches of ore entering the cycle.

2. In a cyclical process of treating complex ores containing zinc, the steps which consist in chloridizing the dry ore in presence of sodium chlorid, extracting the soluble chlorids, precipitating the metal contents of the solution with ultimate replacement of their chlorids by sodium chlorid, electrolyzing the resulting sodium chlorid solution, and applying the evolved chlorin to the treatment of fresh batches of ore entering the cycle.

3. In a cyclical process of treating complex ores containing zinc, the steps which consist in chloridizing the ore, extracting the soluble chlorids by means of a solution containing sodium chlorid, precipitating the metal contents of the solution with ultimate replacement of their chlorids by sodium chlorid, electrolyzing the resulting sodium chlorid solution, and applying the evolved chlorin to the treatment of fresh batches of ore entering the cycle.

4. In a cyclical process of treating complex ores containing zinc, the steps which consist in chloridizing the ore, extracting the soluble chlorids, precipitating the metal contents of the solution with ultimate replacement of their chlorids by sodium chlorid, electrolyzing the resulting sodium chlorid solution, applying the evolved chlorin to the treatment of fresh batches of ore entering the cycle, and applying the chlorinated anode liquor as a solvent for the chlorids derived from said ore.

5. In a cyclical process of treating complex ores containing zinc, the steps which consist in chloridizing the dry ore in presence of sodium chlorid, extracting the soluble chlorids, precipitating the metal contents of the solution with ultimate replacement of their chlorids by sodium chlorid, electrolyzing the resulting sodium chlorid solution, applying the evolved chlorin to the treatment of fresh batches of ore entering the cycle, and applying the chlorinated anode-liquor as a solvent for the chlorids derived from said ore.

6. In a cyclical process of treating complex ores containing zinc, the steps which consist in chloridizing the ore, extracting the soluble chlorids, precipitating the metal contents of the solution with ultimate replacement of their chlorids by sodium chlorid, electrolyzing the resulting sodium chlorid solution, applying the evolved chlorin to the treatment of fresh batches of ore entering the cycle, applying the chlorinated anode-liquor as a solvent for the chlorids derived from said ore, and carbonating the caustic product of the electrolysis and utilizing the same for the precipitation of zinc.

7. In a cyclical process of treating complex ores containing zinc, the steps which consist in chloridizing the dry ore in presence of sodium chlorid, extracting the soluble chlorids, precipitating the metal contents of the solution with ultimate replacement of their chlorids by sodium chlorid, electrolyzing the resulting sodium chlorid solution, applying the evolved chlorin to the treatment of fresh batches of ore entering the cycle, applying the chlorinated anode-liquor as a solvent for the chlorids derived from said ore, and carbonating the caustic product of the electrolysis and utilizing the same for the precipitation of zinc.

8. The hereindescribed cyclic process of treating sulfid ores containing zinc and iron, which consists in chloridizing the ore, extracting the soluble chlorids, precipitating the iron by means of an oxy-ore of zinc, thereby concentrating the zinc content of the solution, precipitating zinc by means of sodium carbonate, thereby concentrating the sodium chlorid content of the solution, electrolyzing the resulting sodium chlorin solution, applying the evolved chlorin to the treatment of fresh batches of ore entering the cycle, and carbonating the caustic product of the electrolysis and utilizing the same for the precipitation of zinc.

9. The hereindescribed cyclic process of treating sulfid ores containing zinc and iron, which consists in chloridizing the ore, extracting the soluble chlorids, precipitating the iron by means of an oxy-ore of zinc, thereby concentrating the zinc content of the solution, precipitating zinc by means of sodium carbonate, thereby concentrating the sodium chlorid content of the solution, electrolyzing the resulting sodium chlorin solution, applying the evolved chlorin to the treatment of fresh batches of ore entering the cycle, applying the chlorinated anode-liquor as a solvent for the chlorids derived from said ore, and carbonating the caustic product of the electrolysis and utilizing the same for the precipitation of zinc.

10. The hereindescribed cyclic process of treating sulfid ores containing zinc, iron, and manganese, which consists in chloridizing the ore, extracting the soluble chlorids, precipitating the iron and manganese by means of an oxy-ore of zinc and sodium hypochlorite, thereby concentrating the zinc chlorid and sodium chlorid contents of the solution, precipitating zinc by means of sodium carbonate, thereby further concentrating the sodium chlorid content of the solution, electrolizing the resulting sodium chlorid solution, applying the evolved chlorin to the treatment of fresh batches of ore entering the cycle, and carbonating the caustic product of the electrolysis and utilizing the same for the precipitation of zinc.

In testimony whereof, we affix of signatures in presence of two witnesses.

COURT C. TITUS.
WILLIAM J. BARENSCHEER.

Witnesses to the signature of Barenscheer:
ALBERT J. GALEN,
PEARL YOUNG.

Witnesses to the signature of Court C. Titus:
MORRIS SCHNEEDE,
M. L. HEWETT.